US010513965B2

(12) United States Patent
Biddulph

(10) Patent No.: US 10,513,965 B2
(45) Date of Patent: Dec. 24, 2019

(54) COOLING OF INTERNAL COMBUSTION ENGINES

(71) Applicant: UAV Engines Ltd., Lichfield (GB)

(72) Inventor: Christopher John Biddulph, Stoke on Trent (GB)

(73) Assignee: UAV Engines Ltd. (GB)

( * ) Notice: Subject to any disclaimer, the term of this patent is extended or adjusted under 35 U.S.C. 154(b) by 0 days.

(21) Appl. No.: 15/809,114

(22) Filed: Nov. 10, 2017

(65) Prior Publication Data

US 2018/0087436 A1 Mar. 29, 2018

Related U.S. Application Data

(63) Continuation of application No. 14/903,766, filed as application No. PCT/EP2014/061446 on Jun. 3, 2014, now Pat. No. 10,253,677.

(30) Foreign Application Priority Data

Jul. 10, 2013 (EP) ..................................... 13175982

(51) Int. Cl.
| | | |
|---|---|---|
| *F01P 3/18* | (2006.01) | |
| *F28D 1/053* | (2006.01) | |
| *B64D 33/10* | (2006.01) | |
| *F02B 61/04* | (2006.01) | |
| *F28D 1/02* | (2006.01) | |

(52) U.S. Cl.
CPC ................ *F01P 3/18* (2013.01); *B64D 33/10* (2013.01); *F02B 61/04* (2013.01); *F28D 1/05366* (2013.01); *F01P 2050/20* (2013.01); *F28D 2001/028* (2013.01)

(58) Field of Classification Search
CPC ......... F01P 3/18; F01P 2050/20; B64D 33/10; F28D 1/05366; F28D 2001/028; F02B 61/04
USPC ....................................................... 123/41.01
See application file for complete search history.

(56) References Cited

U.S. PATENT DOCUMENTS

| | | | | | |
|---|---|---|---|---|---|
| 1,374,190 | A | * | 4/1921 | Curran ................... | B64D 33/10 |
| | | | | | 123/41.01 |
| 2,171,817 | A | * | 9/1939 | Wagner ..................... | F01P 3/18 |
| | | | | | 123/41.31 |
| 2,175,432 | A | * | 10/1939 | Gerstung .................. | F01P 3/18 |
| | | | | | 123/41.04 |
| 2,405,422 | A | * | 8/1946 | Halford .................. | B64D 33/10 |
| | | | | | 123/41.7 |

FOREIGN PATENT DOCUMENTS

| | | |
|---|---|---|
| GB | 535253 A | 4/1941 |
| GB | 2348670 A | 10/2000 |

\* cited by examiner

*Primary Examiner* — Syed O Hasan
(74) *Attorney, Agent, or Firm* — GrayRobinson, P.A.; Michael J. Colitz, III

(57) ABSTRACT

An engine assembly (10) for a propeller-driven aircraft is disclosed, the assembly including an engine (11), a drive shaft (13) driven by the engine (11), and a radiator (20) comprising an aperture (24) for receiving the drive shaft (13), the aperture (24) being located such that the radiator (20) substantially circumferentially surrounds the drive shaft (13). The aperture (24) may take various forms, such as a hole within the interior of the radiator (20) or a blind slit formed within the radiator (20).

11 Claims, 6 Drawing Sheets

COOLING OF INTERNAL COMBUSTION ENGINES

CROSS-REFERENCE TO RELATED APPLICATION

This application is a continuation of and claims priority to application Ser. No. 14/903,766 filed Jan. 8, 2016, which is a continuation of and claims priority under 35 U.S.C. § 371 to International Application No. PCT/EP2014/061446 filed on Jun. 3, 2014, which in turn claims priority to European App. No. 13175982.1 filed on Jul. 10, 2013, the contents of which are incorporated herein by reference for all purposes.

TECHNICAL FIELD

This invention relates to cooling of internal combustion engines, and particularly but not exclusively to a radiator for cooling an internal combustion engine within a propeller aircraft.

BACKGROUND

Internal combustion engines are widely used in virtually all types of powered vehicles, including automobiles, motorcycles, boats and aircraft. A major problem with internal combustion engines is the generation of waste heat, which must be efficiently transferred from the engine to the surroundings in order to avoid heat-related engine failure such as cracking, warping or degradation of the engine lubrication oil.

There are two common engine cooling techniques: air cooling and liquid cooling. Whilst air cooling was popular during the infancy of combustion engines, it is no longer widely used; liquid cooling is now the favored cooling technique for most combustion engines.

Air cooling involves directing air, typically at a high velocity, around the engine cylinder or cylinder block. Fins or other formations are typically provided on the outer surface of the cylinder or cylinder block in order to increase the surface area and hence enhance heat transfer.

In liquid cooling, the transfer of heat from the engine to the surroundings is via an intermediary liquid cooling circuit. A liquid coolant is passed through fluid passages defined within or around the engine cylinder or cylinder block, whereupon heat generated during the internal combustion process is transferred to the coolant. The coolant is then passed to a heat exchanger, commonly known as a radiator, having a large surface area exposed to the surroundings. As the coolant circulates through the radiator, heat is transferred from the liquid coolant to the surroundings. The cold coolant subsequently exits the radiator and is fed back to the engine cylinder or cylinder block to repeat the process. Alternatively, in an open circuit, the cooling fluid that exits the radiator may be disposed of and fresh cooling fluid fed to the engine cylinder or cylinder block.

In general, the liquid coolant utilized in liquid-cooling devices is water based but may comprise other agents such as antifreeze and/or corrosion inhibitors.

A cooling technique similar to the above-described liquid cooling may also be employed in relation to the engine lubricating oil. Cooling of the engine-lubricating oil is commonly known as "oil cooling" and comprises passing the engine oil from the engine to its own dedicated radiator and subsequently returning the oil to the engine. Oil cooling is generally employed in conjunction with one of the above-described air-cooling and liquid-cooling techniques i.e. the engine oil is typically not the principal coolant.

In order for liquid cooling and oil cooling to constitute effective engine cooling techniques, there must be efficient heat transfer from the radiator to the surroundings. In practice, this is achieved by providing the radiator with an array of fins or other formations in order to increase the surface area thereof, and by generating a high velocity air flow around and/or though the radiator.

One known technique for generating an air flow around or through a radiator is to rely on ram-air pressure provided by the forward motion of the vehicle. In such arrangements, air intakes are provided at the front of the vehicle and air received through these intakes is directed towards the radiator. However, one problem with this arrangement is that the cooling air flow is only generated when the vehicle is in motion. This can lead to overheating of the engine when engine is operational but the vehicle is stationary, for example when an aircraft is on the ground ready for take-off.

It is also known to direct air towards the radiator via one or more fans. The power required to operate the fans must, however, be provided by the engine, thereby increasing the total engine load and hence contributing to the heating of the engine. In view of the fact that the fans are provided for the sole purpose of cooling the engine, the side-effect of heating the engine represents a considerable failing in a fan-based engine cooling arrangement.

DEFINITIONS

The term "radiator" is used herein to include any form of heat exchanger and is not restricted to a particular form or mode of heat transfer. For example, the heat exchangers used in known engine cooling systems are encompassed within the term "radiator" in spite of the fact that the heat transfer is predominantly via convection and conduction as opposed to radiation.

The term "aperture" is used herein to include a hole, a slot, a gap, a slit, an indentation or any other form of opening.

STATEMENT OF INVENTION

According to the present invention, there is provided an engine assembly as claimed in the accompanying claims.

In accordance with the present invention, as seen from a first aspect, there is provided an engine assembly for an aircraft, the assembly comprising:

an internal combustion engine;

a drive shaft configured to be driven by the engine;

a radiator comprising an aperture through which the drive shaft is received, the aperture being located such that the radiator substantially circumferentially surrounds the drive shaft, wherein the aperture comprises a slit that extends from an outer peripheral edge of the radiator to an interior of the radiator.

One advantage of the present invention is that distance between the radiator and the engine is reduced in comparison to known engine assemblies. Accordingly, fluid lines between the engine and the radiator are short and direct, if such lines are required at all. This provides the benefits of reduced cost, reduced weight, a simplified installation and a reduced risk of leaks.

Preferably the radiator circumferentially surrounds at least 70% of the drive shaft. In other words, a radial line drawn from the longitudinal axis of the drive shaft intersects the radiator over at least 70% of the possible 360 degree azimuthal angular range.

More preferably, the radiator circumferentially surrounds at least 90% of the drive shaft. Yet more preferably, the radiator circumferentially surrounds 100% of the drive shaft.

The radiator may be arranged for cooling a coolant fluid that has been heated by the engine prior to passing to the radiator. In this embodiment, the engine assembly may comprise one or more fluid passages within or proximal to the engine, the fluid passages being fluidly coupled to the radiator such that the coolant fluid passes from the fluid passages to the radiator.

Alternatively, the radiator may be arranged for cooling engine lubricating oil that is passed to the radiator from the engine.

Preferably, the aperture may comprise a blind slit that extends from an outer peripheral edge of the radiator to an interior of the radiator. Preferably the radiator is substantially circular in cross-section, the slit preferably extending radially from an outer peripheral edge of the radiator to a center point of the radiator.

Alternatively, the aperture may comprise a gap that extends from an outer peripheral edge of the radiator to an opposing outer peripheral edge of the radiator such that the aperture separates the radiator into two disconnected portions. Preferably each portion of the radiator is substantially semi-circular in cross-section.

The drive shaft may be coupled to a crank shaft of the engine. Alternatively, the propeller shaft may be received in a rotor of a rotary engine such as a Wankel engine.

The drive shaft is preferably arranged for rotating a propeller. Preferably a proximal end of the drive shaft is coupled to the engine and a distal end of the drive shaft is coupled to the propeller. Advantageously, the location of the radiator between the engine and propeller provides a compact and light weight installation. Furthermore, the rotary action of the propeller assists the air flow around and/or through the radiator. It has been found by the applicants that the air flow provided by the rotation of the propeller is greater than that which may be achieved by relying on the ram-air pressure that is provided by the forward motion of the air vehicle. Furthermore, the propeller generates an air flow even when the engine is running whilst the aircraft is stationary on the ground.

The radiator may comprise a first substantially planar surface arranged to extend in a plane substantially perpendicular to the longitudinal axis of the drive shaft such that the normal to the surface is substantially parallel to the longitudinal axis of the drive shaft. The radiator may further comprise a second substantially planar surface arranged to extend in a plane substantially perpendicular to the longitudinal axis of the drive shaft.

The first surface is preferably proximal to the propeller and the second surface is preferably proximal to the engine when the drive shaft is received in the aperture of the radiator.

Preferably the first and second surfaces are substantially circular.

The radiator may comprise additional apertures for allowing air to pass therethrough. One advantage of this arrangement is that the surface area of the radiator is increased by virtue of the apertures, thereby improving the efficiency of cooling of the radiator.

The radiator may comprise a substantially planar backing member 28, which preferably abuts the second surface of the radiator (FIG. 6). It is envisaged that a planar backing member will be particularly appropriate to embodiments in which the aperture comprises a blind slit or a gap. In these embodiments, the backing member is preferably located at least at the circumferential locations not encompassed by the radiator. In certain embodiments, the backing member may be elongate and arranged to cover an outer portion of the blind slit or both outer portions of the gap, leaving only a central hole through which the drive shaft may be received. In an alternative embodiment, the backing member may have outer dimensions substantially identical to the second surface of the radiator such that the backing member extends to the periphery of the radiator, the backing member preferably comprising a hole located within an interior the backing member through which the drive shaft is received.

The additional apertures may extend longitudinally through the radiator between the first and second surfaces, each aperture thereby defining an elongate passage. The elongate passage may comprise a restricted portion at a substantially longitudinally central position. One advantage of providing a restricted portion is that the velocity of the air is increased at said portion, thereby improving the efficiency of cooling of the radiator. It is thought that this effect will be particularly prevalent when the radiator is located behind the propeller blades and hence receives air that has been accelerated by the rotary action of the propeller blades.

In one embodiment, the radiator is formed of a plurality of substantially parallel elongate tubular elements arranged for conveying cooling fluid, air passages being defined between adjacent elements.

The backing member may comprise apertures at locations corresponding to the locations of the additional apertures provided in the radiator, thereby permitting air to pass through both the radiator and the backing member and hence provide effective cooling of the radiator.

Preferably the radiator comprises a shroud, the shroud preferably comprising a tubular side wall having a longitudinal axis substantially parallel to the longitudinal axis of the drive shaft. More preferably the longitudinal axis of the tubular side wall of the shroud is collinear with the longitudinal axis of the drive shaft. The shroud is preferably arranged to circumferentially surround the drive shaft and at least an inner portion of the radiator.

The tubular side wall of the shroud is preferably upstanding from the first surface of the radiator. More preferably, the tubular side wall of the shroud is upstanding from an outer peripheral edge of the first surface of the radiator.

The shroud may be substantially cylindrical. Alternatively, the tubular side wall of the shroud may flare outwardly, for example the shroud may be frustro-conical.

An air intake for the engine may be provided proximal to a peripheral edge of the radiator.

In accordance with the present invention, as seen from a second aspect, there is provided a radiator for an aircraft, the radiator comprising:

an aperture for receiving a drive shaft, the aperture being located such that the radiator substantially circumferentially surrounds the drive shaft when the drive shaft is received in the aperture; wherein the aperture comprises a slit that extends from an outer peripheral edge of the radiator to an interior of the radiator; and, a longitudinally extending shroud comprising a tubular side wall arranged to circumferentially surround the drive shaft when the drive shaft when the drive shaft is received in the aperture.

The aperture and/or the shroud may be as hereinbefore described.

In accordance with the present invention, as seen from another aspect, there is provided a method of cooling an engine arranged for driving a propeller, the method comprising:

installing a radiator as hereinbefore described such that the radiator substantially circumferentially surrounds a drive shaft of the engine;

fluidly connecting the radiator such that the radiator receives fluid that has been heated by the engine.

BRIEF DESCRIPTION OF THE DRAWINGS

An embodiment of the present invention will now be described by way of example only and with reference to the accompanying drawings, in which:

Referring to FIGS. 1(a), 1(b) and 2 of the drawings, there is illustrated an engine assembly 10. The engine assembly 10 forms part of a propeller aircraft (not shown). It is envisaged that the engine assembly 10 will be housed within a cowling (not shown) and located towards the front of the aircraft.

Figure 1A:
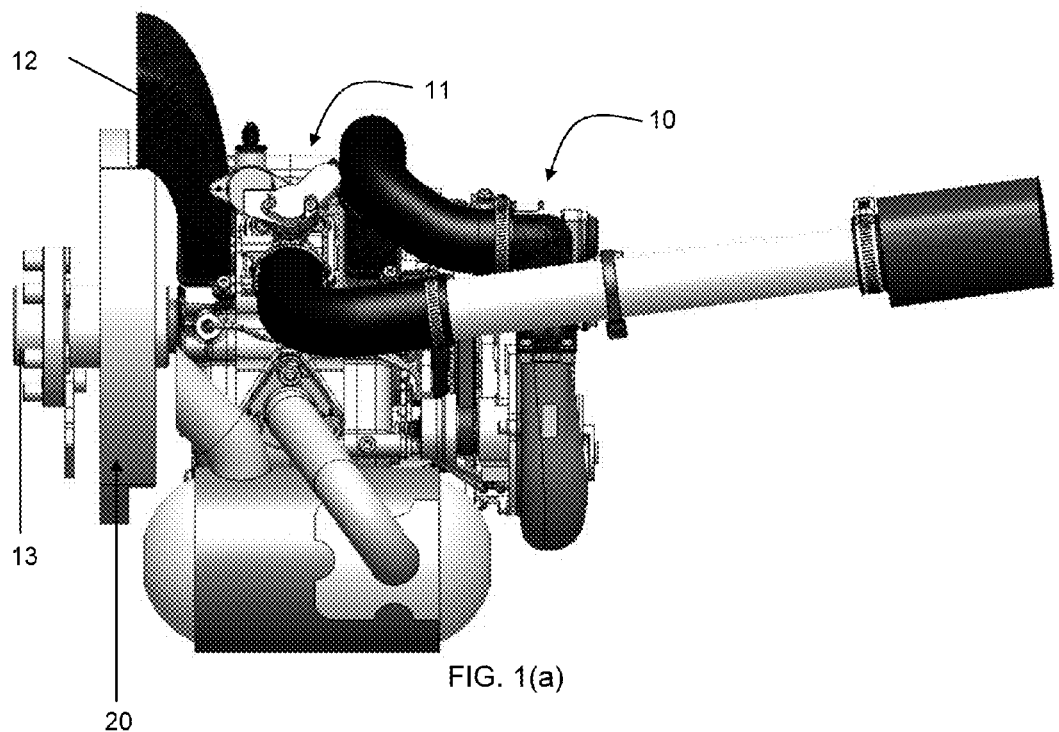
FIG. 1(a) is a side view of an engine assembly in accordance with an embodiment of the present invention.

The assembly 10 includes an internal combustion engine 11. The engine 11 is supplied with air and fuel for combustion by means of an air intake duct 12 and a fuel injector respectively. The air intake duct 12 is arranged to receive air from the front of the aircraft via an air inlet aperture formed in the engine cowling.

The engine 11 is arranged for rotating a drive shaft 13. It is envisaged that the engine 11 will be a Wankel engine, in which case a proximal end of the drive shaft 13 will be located within the rotor of the engine 11. A distal end of the drive shaft 13 is coupled to a propeller (not shown) located at the nose of the aircraft.

The assembly 10 further includes an engine cooling circuit for circulating cooling fluid around the engine 11. The cooling circuit comprises a pump (not shown) and a series of conduits (not shown) defined within or around the engine 11. The cooling circuit further comprises a radiator 20 mounted directly on the main engine body 11. The position of the radiator 20 proximal to the engine 11 minimizes the total distance that must be spanned by the cooling circuit and hence provides a reduced cost, reduced weight, a simplified installation and a reduced risk of leaks. The radiator 20 is provided with an inlet 21 for receiving cooling fluid from the conduits defined within or around the engine cylinder block. The radiator is also provided with an outlet 22 for passing cooling fluid that has been cooled by the radiator to a downstream component in the engine cooling circuit. In certain embodiments, the cooling fluid that exits the radiator outlet 22 is immediately returned to the conduits defined within or around the engine 11 for absorption of heat generated by the engine 11.

The radiator 20 is formed of a plurality of spaced apart elongate tubular elements 23 arranged for conveying cooling fluid. Together, the plurality of tubular elements 23 provide the radiator 20 with a substantially cylindrical shape, the radius of the radiator 20 being substantially greater than the longitudinal length of the radiator 20. First and second manifolds (not shown) are provided at the respective ends of the elongate tubular elements 23. In use, the cooling fluid that enters the radiator 20 at the fluid inlet 22 is divided at the first manifold between each of the tubular elements 23. The cooling fluid then passes through the tubular elements 23 and is re-combined at the second manifold for subsequent passage out of the radiator 20. The above-described structure of spaced apart tubular elements 23 provides the radiator 20 with a large surface area and therefore facilitates efficient cooling thereof. Furthermore, the elongate spaces between the tubular elements 23 define air passages through the radiator 20, thereby permitting air to flow through the radiator 20 and hence enhancing the efficiency of cooling thereof.

Figure 5:
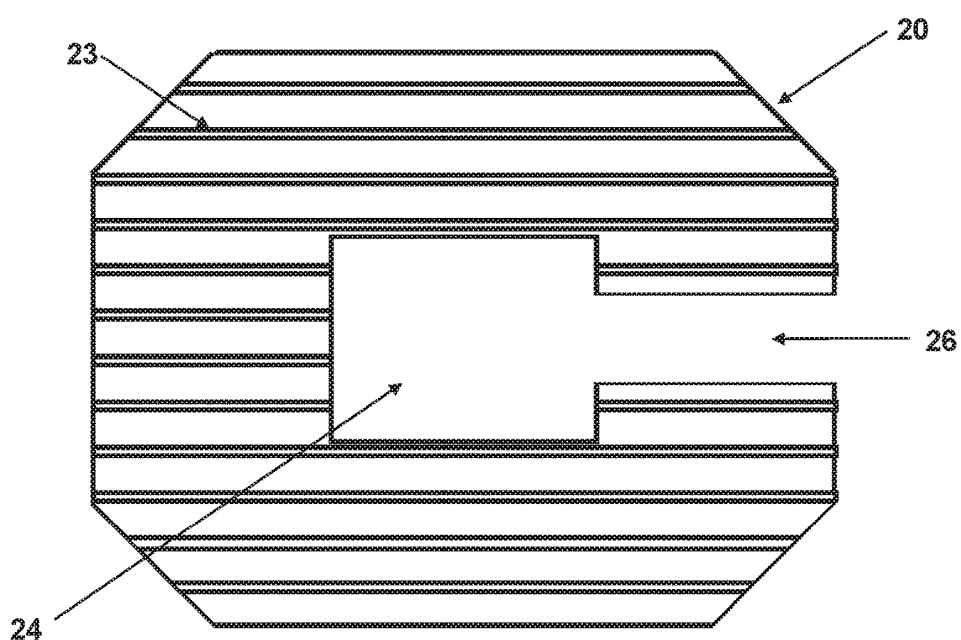
FIG. 5 is a detailed view of the radiator with a slit.
Figure 6:
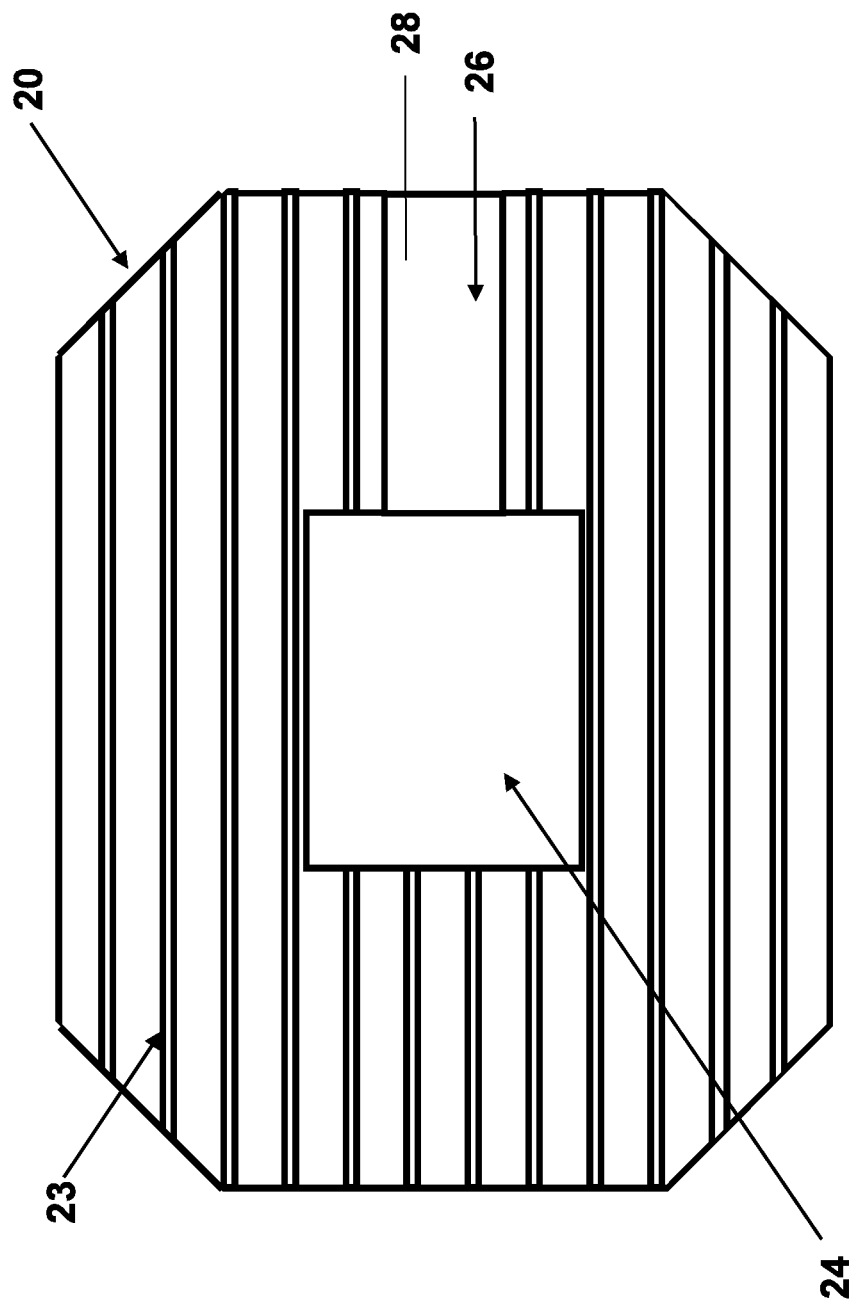
FIG. 6 is a view of the backing member.

An aperture 24 is formed in the radiator 20, though which the drive shaft 13 of the engine assembly extends. The location of the aperture 24 in the center of the radiator 20 permits the radiator 20 to circumferentially surround the drive shaft 13. The dimensions of the aperture 24 are such that the drive shaft 13 fits within the aperture 24 without making physical contact therewith but leaving minimal free space therebetween. In the illustrated embodiment, the aperture 24 is a square having a side length marginally greater than the diameter of the drive shaft 13. In an alternative embodiment (not shown), the aperture may be circular and comprise a diameter marginally greater than the diameter of the drive shaft 13. FIG. 5 illustrates radial slit 26 formed within radiator 20.

Figure 3:
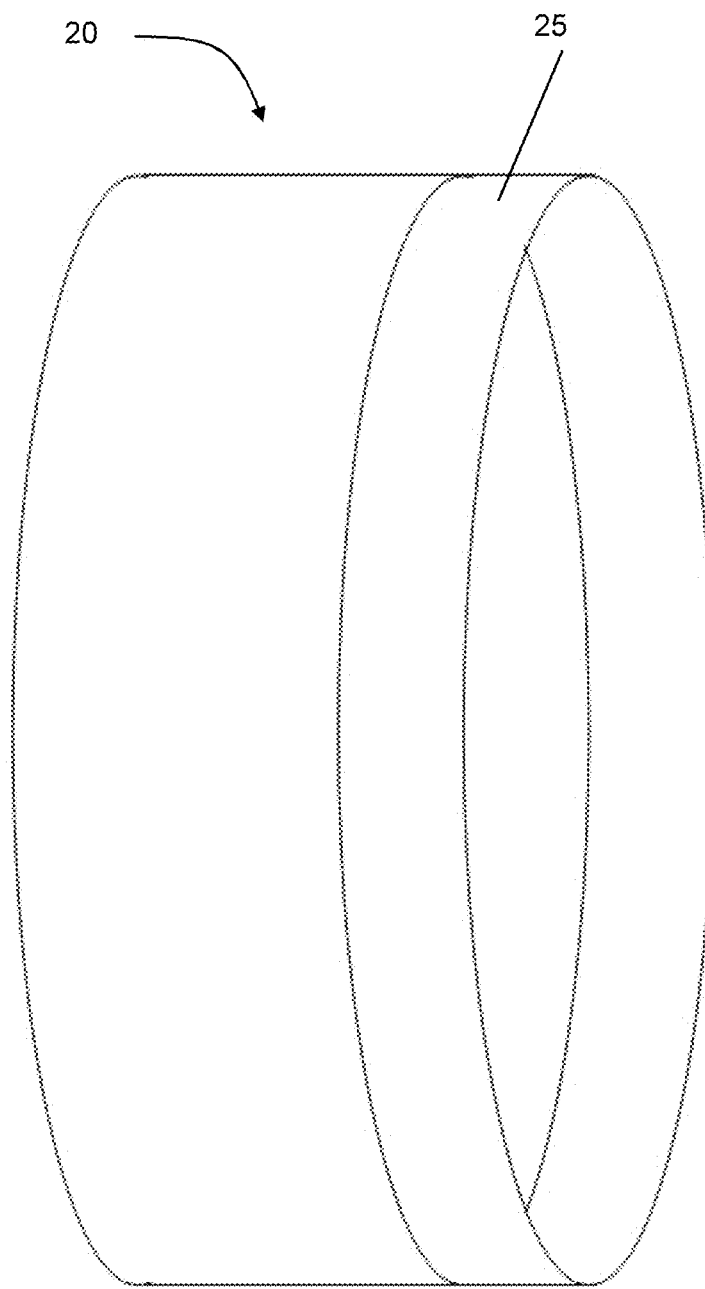
FIG. 3 is a perspective view of an alternative embodiment of a radiator suitable for use within the engine assembly illustrated in FIGS. 1(a) and 1(b); and, FIG. 4 is a flow diagram of a method of cooling an engine arranged for driving a propeller in accordance with an embodiment of the present invention.

In certain embodiments, the radiator may be provided with a longitudinally extending shroud 25, as illustrated in FIG. 3. The shroud 25 consists of a tubular side wall that extends from peripheral edge of the radiator 20. The tubular side wall of the shroud 25 thus constitutes an extension to the side wall of the radiator 20. The longitudinal axis of the tubular side wall of the shroud 25 is co-axial with the longitudinal axis of the drive shaft (not shown in FIG. 3) such that the shroud 25 circumferentially surrounds the drive shaft. When the propeller (not shown) is connected to the drive shaft, the end of the tubular side wall of the shroud distal from the radiator 20 is adjacent to the rear side of the propeller blades and marginally spaced apart therefrom. It has been found by the applicants that a shroud such as this enhances the air flow through the radiator 20 and hence improves the efficiency of engine cooling.

Figure 1B:
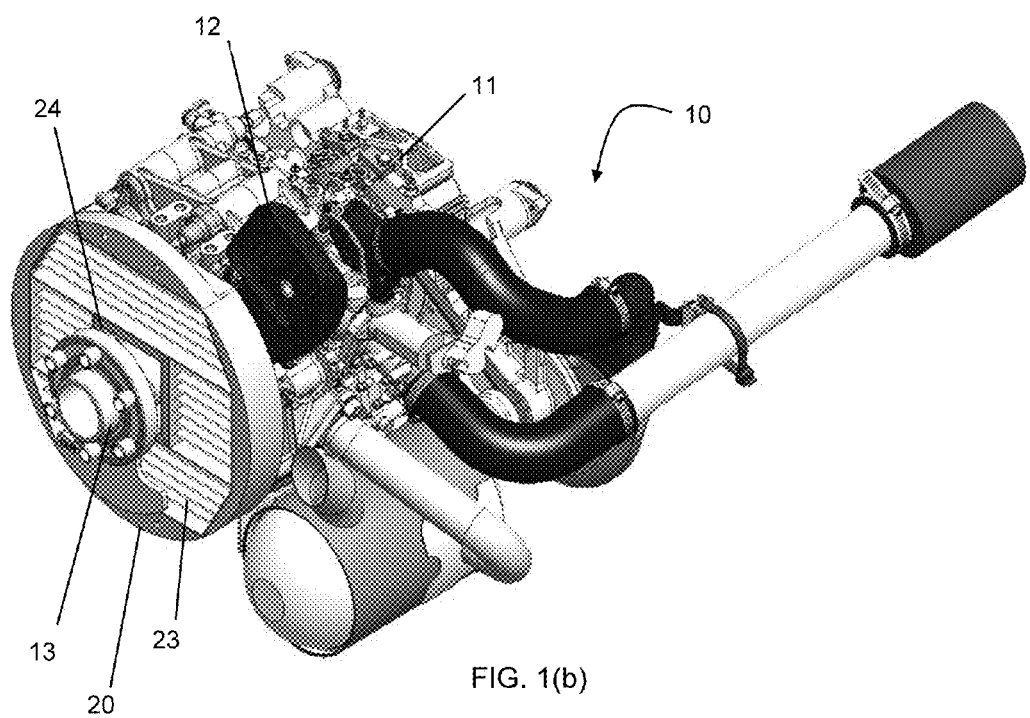
FIG. 1(b) is a perspective view of the engine assembly of FIG. 1(a)
Figure 2:
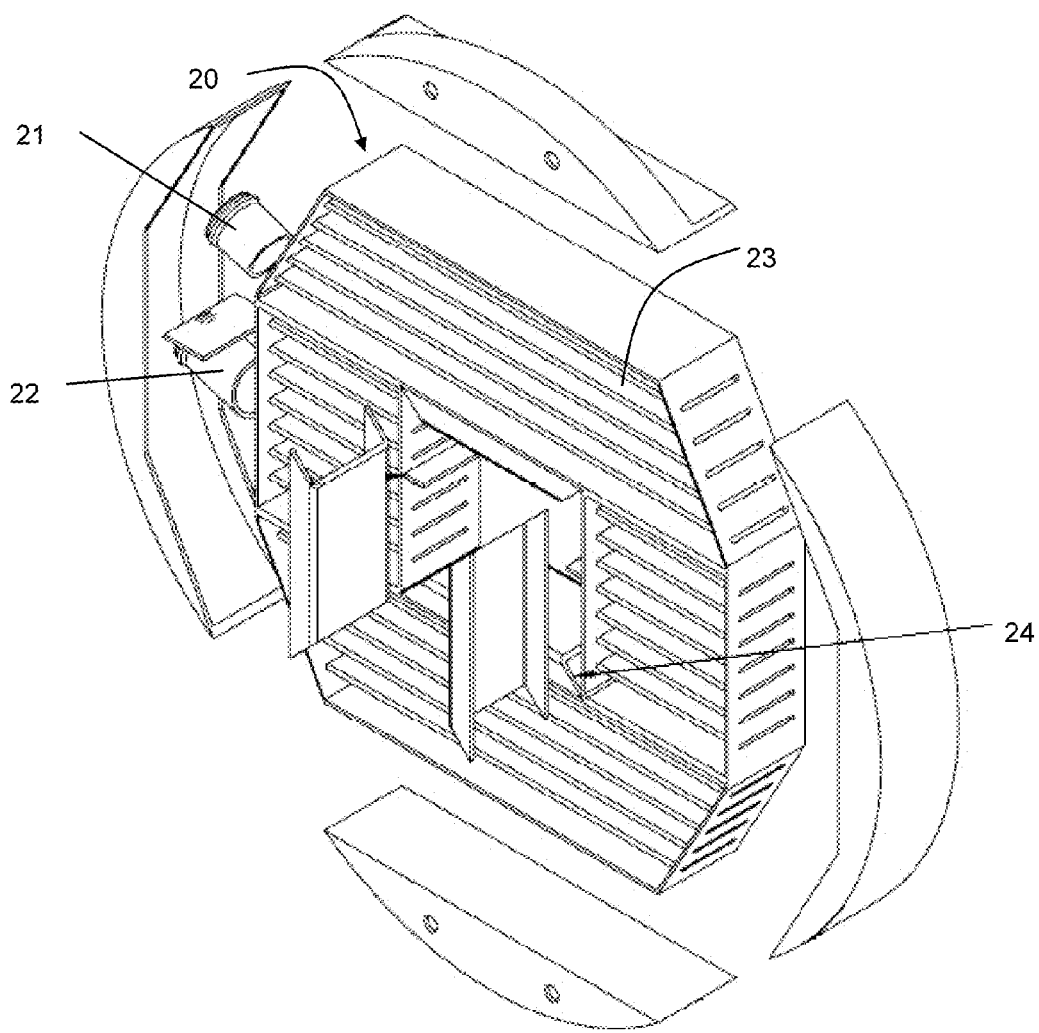
FIG. 2 is an exploded perspective view of the radiator of the engine assembly illustrated in FIGS. 1(a) and 1(b)
Figure 4:
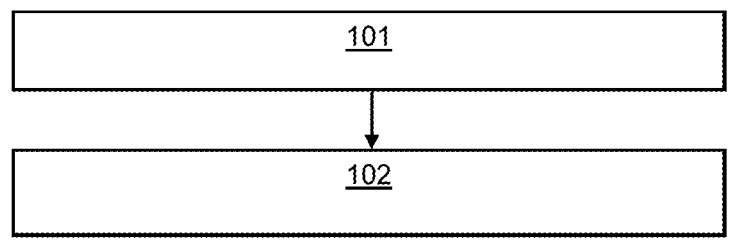

It will be appreciated that it is possible to retro-fit a radiator 20 as described above to an existing engine assembly. With reference to FIG. 4, retro-fitting the radiator 20 comprises installing the radiator 20 around the drive shaft 13 at step 101. It is envisaged that the radiator 20 will be installed in the position illustrated in FIGS. 1(a) and 1(b). The engine cooling circuit is then fully connected at step 102. In particular, fluid conduits formed within the engine 11 are connected to the radiator 20.

Once the radiator 20 is installed and is operational, the pump of the engine cooling circuit pumps cooling fluid into the conduits defined in and around the engine 11, whereupon the cooling fluid absorbs heat from the engine 11 and thus cools the engine 11. The coolant fluid from the conduits is then passed to the inlet 21 of the radiator 20 and channeled through the elongate tubular elements 23 of the radiator 20. The large surface area to volume ratio of each of the tubular elements 23 provides effective cooling of the coolant fluid, which is then passed out of the radiator 20 via the fluid outlet 22.

The efficiency of cooling provided by the radiator 20 may be greatly enhanced by energizing the propeller. In particular, the location of the radiator 20 downstream of the propeller enables exploitation of the high velocity air flow generated by the propeller.

What is claimed is:

1. An engine assembly for an aircraft, the assembly comprising:
    an engine;
    a drive shaft configured to be driven by the engine;
    a radiator comprising an aperture through which the drive shaft is received, the aperture being located such that the radiator substantially circumferentially surrounds the drive shaft, characterized in that the aperture comprises a slit that extends from a radial outer peripheral edge of the radiator to the aperture and center-point of the radiator; and
    wherein the radiator further comprises a substantially planar backing member, and wherein the substantially planar backing member abuts a surface of the radiator proximate the engine.

2. An engine assembly according to claim 1, wherein the aperture comprises a gap that extends from an outer peripheral edge of the radiator to an opposing outer peripheral edge of the radiator such that the aperture separates the radiator into two disconnected portions.

3. An engine assembly according to claim 1, where the radiator is arranged to circumferentially surround at least 90% of the drive shaft.

4. An engine assembly according to claim 1, wherein the drive shaft is arranged for rotating a propeller.

5. An engine assembly according to claim 1, wherein the radiator comprises additional apertures for allowing air to pass therethrough.

6. An engine assembly according to claim 1, further comprising a planar backing member arranged to abut a surface of the radiator proximal to the engine, the planar backing member comprising a hole within an interior thereof through which the drive shaft is received.

7. An engine assembly according to claim 1, wherein the radiator further comprises a longitudinally extending shroud, the longitudinally extending shroud comprising a tubular side wall arranged to circumferentially surround the drive shaft.

8. An engine assembly according to claim 7, wherein the tubular side wall of the longitudinally extending shroud is located at a peripheral edge of the radiator.

9. An engine assembly according to claim 7, wherein the longitudinally extending shroud is located at a side of the radiator distal from the engine.

10. A radiator for an aircraft, the radiator comprising:
    an aperture for receiving a drive shaft, the aperture being located such that the radiator substantially circumferentially surrounds the drive shaft when the drive shaft is received in the aperture;
    wherein the aperture comprises a slit that extends from a radial outer peripheral edge of the radiator to the aperture and center-point of the radiator; and,
    a shroud comprising a tubular side wall having a longitudinal axis substantially parallel to the longitudinal axis of the drive shaft and arranged to circumferentially surround the drive shaft when the drive shaft is received in the aperture; and
    wherein the radiator further comprises a substantially planar backing member, and wherein the substantially planar backing member abuts a surface of the radiator which is arranged to be fixed proximate the engine.

11. A method of cooling an engine arranged for driving a propeller, the method comprising:
    installing a radiator comprising an aperture for receiving a drive shaft, the aperture comprising a slit that extends from a radial outer peripheral edge of the radiator to the aperture and center-point of the radiator and the radiator further comprising a substantially planar backing member abutting a surface of the radiator, the radiator being installed such that the radiator substantially circumferentially surrounds the drive shaft;
    fluidly connecting the radiator such that the radiator receives fluid that has been heated by the engine and such that the substantially planar backing member is proximate the engine.

* * * * *